US006792962B1

(12) United States Patent
Smith

(10) Patent No.: US 6,792,962 B1
(45) Date of Patent: Sep. 21, 2004

(54) ENHANCED BACKFLOW PREVENTION APPARATUS AND METHOD

(75) Inventor: Alan John Smith, Bountiful, UT (US)

(73) Assignee: Orbit Irrigation Products, North Salt Lake, UT (US)

( * ) Notice: Subject to any disclaimer, the term of this patent is extended or adjusted under 35 U.S.C. 154(b) by 36 days.

(21) Appl. No.: 10/307,792

(22) Filed: Dec. 2, 2002

(51) Int. Cl.[7] .............................................. F18K 24/04
(52) U.S. Cl. ....................................... 137/12; 137/218
(58) Field of Search .................................. 137/218, 12

(56) References Cited

U.S. PATENT DOCUMENTS

| | | | | |
|---|---|---|---|---|
| 2,328,598 A | * | 9/1943 | Anderson | 137/218 |
| 3,416,556 A | * | 12/1968 | Nelson | 137/218 |
| 3,713,457 A | * | 1/1973 | McInnis et al. | 137/218 |
| 3,727,630 A | * | 4/1973 | McInnis | 137/218 |
| 3,951,163 A | | 4/1976 | Rodieck | |
| 4,014,361 A | | 3/1977 | Rodieck | |
| 4,232,706 A | * | 11/1980 | Ericson | 137/526 |
| 5,983,929 A | * | 11/1999 | Andersson | 137/526 |

OTHER PUBLICATIONS

Flo–Pro Electric AVB catalog 1997; Toro Flo–Pro Valves. TORO; "New Product Information"; 1991 Catalog printed on Wednesday, Mar. 7, 1990.
"Electric Anti–Siphon Valves—Residential"; Hardie 1996 700 series Electric and 300 series; pp. 26–27.
Rain Bird ASVF Series Valves; "Rain Bird"; http://www.sprinkleerwarehouse.com/shop3/media/asvfspec.htm; pp. 1–2; printed on Jan. 14, 2003.
Hunter Anti–Siphon Details; "Electric Valve with Atmospheric Backflow Prevention in an Economical Valve Designed for Residential Use"; http://www.bwpipe.com/Hunter%20–Anti–siphon%20valve%20Details.htm; pp.1–2; printed on Jan. 14, 2003.
Jess Stryker's Anti–Siphon Valve Installation Details— "Landscape Irrigation System Installation Tutorial"; Anti–Siphon Valves; http://www.jessstyker.com/instal07.htm; Printed on Jan. 14, 2003.

* cited by examiner

Primary Examiner—Gerald A. Michalsky
(74) Attorney, Agent, or Firm—Madson & Metcalf

(57) ABSTRACT

A backflow prevention apparatus and method are provided for use in irrigation systems. An anti-siphoning device may have a housing, a plunger, a plunger retainer, and a cap. The housing has inlet and outlet channels formed therein, with the outlet channel running through the interior of the inlet channel. The plunger has a generally annular shape and is disposed to block water flow from the outlet channel into the inlet channel, but to allow flow from the inlet channel to the outlet channel. When the inlet channel is closed, the plunger permits air to flow into the outlet through the cap, the plunger retainer, and a central opening formed in the plunger. The plunger may have an elastomeric exterior to provide a more effective seal between the plunger and the inlet channel.

28 Claims, 4 Drawing Sheets

ENHANCED BACKFLOW PREVENTION APPARATUS AND METHOD

BACKGROUND OF THE INVENTION

1. Field of the Invention

The present invention relates to irrigation systems and methods. More specifically, the present invention relates to an apparatus and method for avoiding backflow of water from an irrigation system to an associated water supply.

2. Description of Related Art

Irrigation not only permits foodstuffs to be grown, but also enables the cultivation of attractive plant life that otherwise would not have sufficient water to thrive. Many households now utilize sprinkler systems to provide irrigation in a comparatively uniform and trouble-free manner.

Often, a control unit such as a timer is used to regularly initiate operation of the sprinkler system to automatically provide the desired distribution of irrigation water. The timer is electrically connected to a plurality of electrically operated valves, each of which is able to permit water to flow into a corresponding zone of the sprinkler system. The valves must be individually activated so that the entire pressure and flow rate available will be focused on each zone, in turn.

In residential systems, the water for irrigation systems often is drawn from a supply of potable water. The irrigation system may be subject to a number of impurities such as fertilizers, pesticides, dirt, and insects, all of which may enter through sprinkler heads or other openings. Hence, it is desirable to avoid "backflow," or flow of irrigation water back into the water supply.

Unfortunately, although the water supply is usually positively pressurized with respect to the irrigation system, a reverse pressure gradient will sometimes exist due to the operation of valves and flow restrictors within the irrigation system. Hence, it is desirable, and in many locations, legally required, to use some type of backflow prevention device to avoid contamination of the water supply. Sometimes, backflow prevention devices known at atmospheric vacuum breakers (AVB's) are sold in combination with valves; the valve and AVB combination is referred to as an "anti-siphoning valve."

AVB's are tested according to the amount of backflow permitted by the AVB under normal irrigation system operating conditions. Backflow is measured in terms of the height of a column of water that is able to flow back through the AVB. The column is cylindrical with the same diameter as the conduit connected to the AVB. Thus, for example, the AVB may be required to allow passage of no more than a three-quarter inch diameter, three inch high column. Since backflow prevention requirements are typically established at a local level and vary from one locale to another, better performing AVB's can be used in a larger number of localities.

Furthermore, it is desirable for an AVB to be simple to manufacture. Unfortunately, many known AVB's have an inlet conduit that extends vertically, through an outlet conduit. Water entering the AVB from the side must therefore move laterally through a channel through the outlet conduit. This arrangement typically requires multiple manufacturing steps.

It is also desirable for an AVB to be as compact as possible. Compactness enhances the appearance and versatility of the AVB. Additionally, a compact AVB is lighter and less expensive to manufacture and ship than a less compact AVB. Furthermore, it is desirable for the AVB to have the smallest possible "head loss," or pressure drop, so that the pressure of the irrigation water will be sufficient to enable the water distribution units to operate effectively.

Hence, it would be an advancement in the art to provide a backflow prevention apparatus and method that provides effectively by permitting only a relatively small amount of backflow under normal irrigation system operating conditions. It would be a further advancement in the art to provide a backflow prevention apparatus and method that is simple, inexpensive, easy to assemble, and reliable in operation. Yet further, it would be an advancement in the art to provide a backflow prevention apparatus and method that is comparatively compact and has a small associated pressure drop.

SUMMARY OF THE INVENTION

The apparatus of the present invention has been developed in response to the present state of the art, and in particular, in response to the problems and needs in the art that have not yet been fully solved by currently available backflow prevention systems and methods. Thus, it is an overall objective of the present invention to provide backflow prevention devices and associated methods that remedy the shortcomings of the prior art.

To achieve the foregoing objective, and in accordance with the invention as embodied and broadly described herein in the preferred embodiment, an irrigation system is used to irrigate an area. The irrigation system has a valving system designed to control flows of irrigation water to a plurality of water distribution units such as sprinklers. The sprinklers receive irrigation water from a plurality of distribution conduits, each of which is in communication with an anti-siphoning valve. Each anti-siphoning valve has a valve and an anti-siphoning device.

Each anti-siphoning valve also has a pair of wires that conveys a valve activation signal to the valve to move the valve between open and closed configurations. The anti-siphoning valves may be connected to a feeder conduit to form a manifold that receives water from a main line. The manifold is disposed underground, and the anti-siphoning valves may extend upward, above-ground from the feeder conduit. Control unit wires extend from the valve wires to a control unit such as a timer.

According to one exemplary embodiment, the anti-siphoning device has a housing, a plunger, a plunger retainer, and a cap. The housing has an inlet channel and an outlet channel. The outlet channel is defined by an interior wall, and the inlet channel is defined by the combination of the interior and exterior walls. The inlet channel has an inlet orifice with a generally annular shape, and the outlet channel has an outlet orifice with a generally circular shape. A plunger cavity is disposed adjacent to the inlet and outlet orifices.

The plunger is disposed in the plunger cavity. The plunger has an annular portion with a central opening generally aligned with the outlet orifice. The plunger also has a plurality of orientation posts that extend away from the orifices and toward the plunger retainer.

The plunger retainer has a lip that extends generally upward and a retention plate in which a plurality of slots and orientation holes are formed. The orientation posts pass through the orientation holes to keep the annular portion of the plunger oriented generally parallel to the orifices. The slots permit air to flow through the retention plate when the annular portion is disposed to unblock the slots.

The cap has a roof supported by a plurality of struts such that vents are defined between the struts. The vents permit ambient air to flow into the cap. The cap is attached to the lip of the plunger retainer.

The plunger cavity is sized such that the plunger is able to move between an open position and a closed position. In the open position, the plunger abuts the retention plate, but is displaced from the inlet orifice so that irrigation water is able to flow relatively freely from the inlet orifice to the outlet orifice through the plunger cavity. The slots of the retention plate are blocked by the annular portion of the plunger so that air is unable to enter the plunger cavity. In the closed position, the plunger abuts the inlet orifice so that irrigation water is unable to flow from the outlet orifice to the inlet orifice. Air is able to enter the plunger cavity via the slots, and is able to move through the plunger via the central opening of the annular portion to reach the outlet orifice.

Thus, the anti-siphoning device permits irrigation water to flow from the inlet channel into the outlet channel. However, flow in the opposite direction (e.g., backflow) is rapidly cut off. Instead, air is permitted to enter the outlet channel to dispel the vacuum effect that tends to cause backflow.

The various parts of the anti-siphoning device may be easily and inexpensively manufactured by a method such as injection molding. In certain embodiments, the housing may be injection molded such that the interior and exterior walls are unitarily and simultaneously formed with the remainder of the housing. The plunger may include a plastic core made by injection molding. The plastic core may be inserted into another mold, into which some type of molten elastomer is injected to form the elastomeric exterior around the plastic core. The cap and the plunger retainer may also be injection molded, and the cap may be permanently attached to the plunger retainer by a method such as welding. The cap/plunger retainer, the plunger, and the housing may then be assembled to form the anti-siphoning device.

Through the use of the apparatus and method of the invention, backflow from irrigation systems may be considerably reduced. The annular shape of the plunger provides rapid and effective sealing to enhance the backflow prevention performance of the anti-siphoning device. Furthermore, the anti-siphoning device may be easily and inexpensively manufactured with a small number of manufacturing steps. Yet further, the anti-siphoning device is comparatively compact and has a small associated pressure drop.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 4, is not intended to limit the scope of the invention, as claimed, but is merely representative of presently preferred embodiments of the invention.

For this application, the phrases "connected to," "coupled to," and "in communication with" refer to any form of interaction between two or more entities, including mechanical, electrical, magnetic, electromagnetic, and thermal interaction. The phrase "attached to" refers to a form of mechanical coupling that restricts relative translation or rotation between the attached objects. The phrases "pivotally attached to" and "slidably attached to" refer to forms of mechanical coupling that permit relative rotation or relative translation, respectively, while restricting other relative motion.

The phrase "attached directly to" refers to a form of attachment by which the attached items are either in direct contact, or are only separated by a single fastener, adhesive, or other attachment mechanism. The term "abutting" refers to items that are in direct physical contact with each other, although the items may not be attached together. The terms "integrally formed" refer to a body that is manufactured integrally, i.e., as a single piece, without requiring the assembly of multiple pieces. Multiple parts may be integrally formed with each other if they are formed from a single workpiece.

Figure 1:
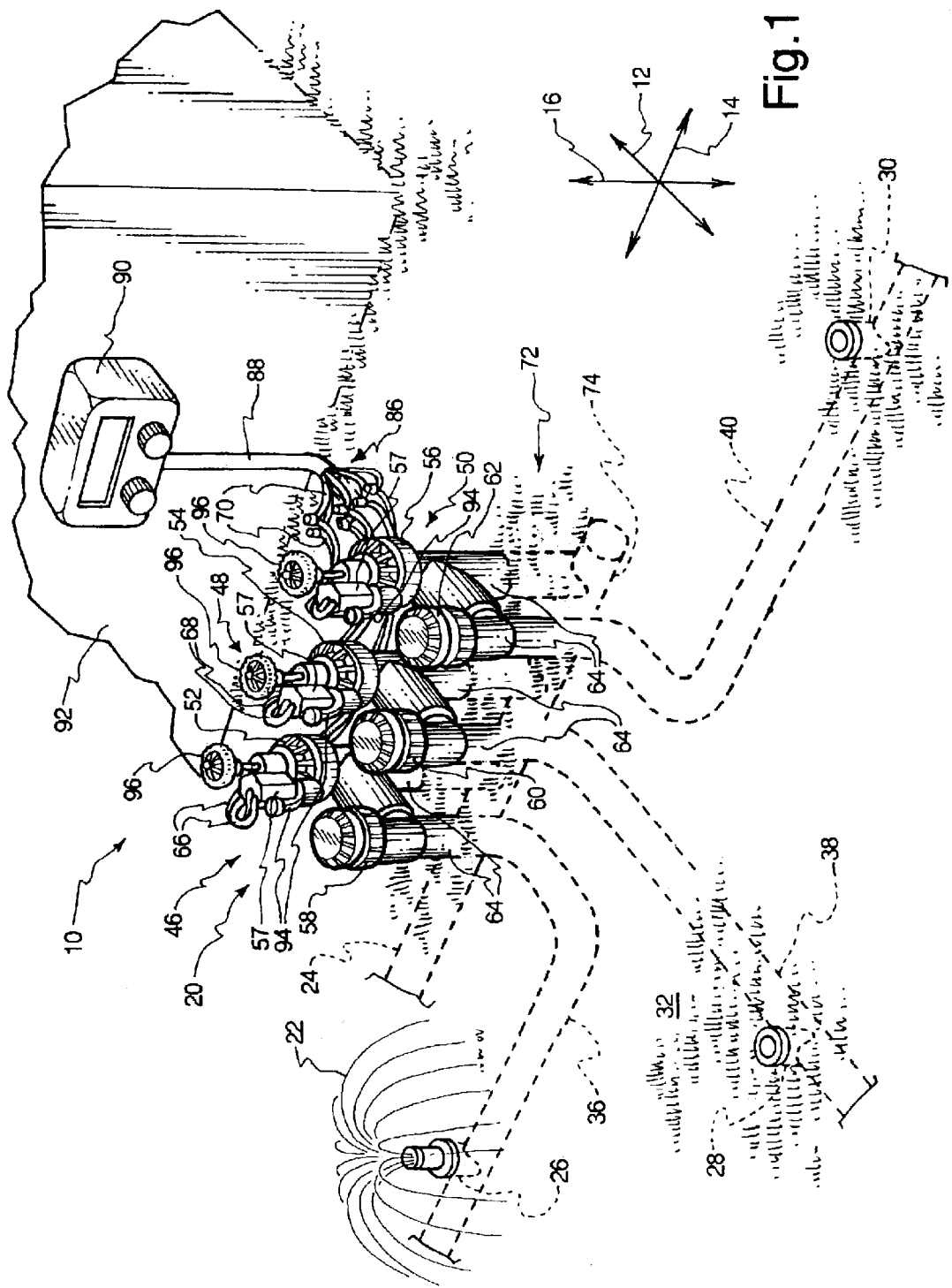
FIG. 1 is a perspective view of a portion of an irrigation system according to one embodiment of the invention, showing a plurality of anti-siphoning valves disposed above the ground.

Referring to FIG. 1, a perspective view depicts an irrigation system 10 according to one embodiment of the invention. The irrigation system 10 has a longitudinal direction 12, a lateral direction 14, and a transverse direction 16. The irrigation system 10 incorporates a valving system 20, which will be described in greater detail subsequently.

The irrigation system 10 is designed to receive irrigation water 22 via a main line 24. "Irrigation water" refers water that is either in the act of being distributed for irrigation purposes, or is located in an irrigation system, within a fluid path coupled to a water distribution unit. Irrigation water may optionally have additives such as fertilizers, pesticides, nutrients, and the like. The irrigation water 22 is distributed by a plurality of water distribution units over a patch of land designated for plant growth.

"Water distribution unit" encompasses a variety of devices used to spread irrigation water, such as pop-up sprinkler heads, rotary sprinklers, bubblers, drip irrigation systems, and the like. The irrigation system 10 includes water distribution units in the form of a first sprinkler head 26, a second sprinkler head 28, and a third sprinkler head 30. The sprinkler heads 26, 28, 30 are arrayed to irrigate an area 32.

The first, second and third sprinkler heads 26, 28, 30 are supplied with irrigation water by first, second and third distribution conduits 36, 38, 40, respectively. Each of the distribution conduits 36, 38, 40 may extend further to supply additional water distribution units (not shown). In this application, a "conduit" is any structure capable of conducting a fluid under pressure from one location to another.

Water flow to the first, second, and third distribution conduits 36, 38, 40 is controlled by a first anti-siphoning valve 46, a second anti-siphoning valve 48, and a third anti-siphoning valve 50, respectively. The anti-siphoning valves 46, 48, 50 may optionally operate to permit water flow to only one of the conduits 36, 38, 40 at any given time, so that each conduit 36, 38, 40, in turn, receives the full pressure and flow rate of irrigation water from the main line 24.

The first, second, and third anti-siphoning valves 46, 48, 50 have electrically driven valving devices in the form of a first valve 52, a second valve 54, and a third valve 56, respectively. As depicted in FIG. 1, the first anti-siphoning valve 46 is in the open configuration to supply water to the first sprinkler head 26 via the first conduit 36. The second and third anti-siphoning valves 48, 50 are in the closed configuration so no significant amount of water flows into the second and third conduits 38, 40, and the second and third sprinkler heads 28, 30 are inactive.

Each of the valves 52, 54, 56 has one or more elements (not shown) that block or unblock water flow through the valve 52, 54, or 56. Thus, each of the valves 52, 54, 56 has a closed configuration, in which water flow is blocked, and an open configuration, in which water flow is comparatively freely permitted. Each of the valves 52, 54, 56 also has an actuator, such as a solenoid 57, that moves the interior elements to move the valve 52, 54, or 56 between the open and closed configurations.

The first, second, and third anti-siphoning valves 46, 48, 50 also include first, second, and third anti-siphoning devices 58, 60, 62, respectively. The anti-siphoning devices 58, 60, 62 are designed to prevent irrigation water from flowing from the distribution conduits 36, 38, 40 back through the valves 52, 54, 56. The anti-siphoning valves 46, 48, 50 extend upward from the ground and are coupled to the main line 24 and the distribution conduits 36, 38, 40 via a plurality of risers 64.

In the embodiment of FIG. 1, the anti-siphoning devices 58, 60, 62 are incorporated into the anti-siphoning valves 46, 48, 50. However, the anti-siphoning devices 58, 60, 62 function relatively independently of the valves 52, 54, 56. Hence, anti-siphoning devices according to the invention may be sold and installed separately from valving structures.

The first, second, and third anti-siphoning valves 46, 48, 50 also include first valve wires 66, second valve wires 68, and third valve wires 70, respectively. Each set of valve wires 66, 68, 70 is coupled to the corresponding valve 52, 54, 56. In this application, the term "valve" is not limited to the embodiment shown, but may include any of a wide variety of actuators and fluid transfer structures.

The anti-siphoning valves 46, 48, 50 are interconnected to form a manifold 72, to which the main line 24 and the distribution conduits 36, 38, 40 are attached. More precisely, the manifold 72 includes a feeder conduit 74 that receives water from the main line 24 at one end. The anti-siphoning valves 46, 48, 50 receive irrigation water from the feeder conduit 74 via the risers 64 attached between the anti-siphoning valves 46, 48, 50 and the feeder conduit 74.

A plurality of control unit wires 86 are connected to valve wires 66, 68, 70. The control unit wires 86 are at least partially covered by a sheath 88 designed to gather and protect the control wires 86. The control unit wires 86 extend from the valve wires 66, 68, 70 to a control unit designed to transmit valve activation signals through the control wires 86. As depicted, the valve wires 66, 68, 70 are connected to the control unit wires 86 via conventional wire nuts. If desired, the control wires 86 may alternatively be coupled to the valve wires 66, 68, 70 via some type of electrical junction unit.

The control unit may take the form of a timer 90, as illustrated in FIG. 1. The timer 90 transmits the valve activation signals via the control unit wires 86 according to a schedule established by a user. The phrase "control unit" is not limited to a timer, but may include any other device that transmits a valve activation signal. Such devices include simple switches, remote receivers, control system processors designed to measure variables and control operation of the irrigation system 10 based on those variables, and the like. The timer 90 may be attached to a wall 92 near the manifold box 82, as shown, or may be disposed at a remote location.

Each of the valves 52, 54, 56 may also have a manual actuator designed to be operated by hand so that the valves 52, 54, 56 can be manually operated. In FIG. 1, the manual actuators take the form of levers 94 that can be pivoted by hand to bypass internal blocking elements of the valves 52, 54, 56, thereby moving the valves 52, 54, 56 to the open position. The levers 94 may be disposed adjacent to the solenoids 57 of the valves 52, 54, 56.

Each of the valves 52, 54, 56 may also have an adjustment mechanism, which is also manually operable, that permits variation of the flow rate of irrigation water through the valves 52, 54, 56 when the valves 52, 54, 56 are open. The adjustment mechanism may be a knob 96 with a threaded shaft that can be actuated inward or outward with respect to the valve 52, 54, or 56 by rotating the knob 96. Such inward or outward motion of the shaft controls the size of the interior orifice through which irrigation water flows through the valves 52, 54, 56 when the valve 52, 54, or 56 are in the open position.

In the embodiment depicted in FIG. 1, the anti-siphoning devices 58, 60, 62 are uniquely designed to provide enhanced backflow prevention, cost effectiveness, and compactness. The manner in which such backflow prevention is performed and the operational steps followed by the anti-siphoning devices will be shown and described in greater detail in connection with FIGS. 2 through 4.

Figure 2:
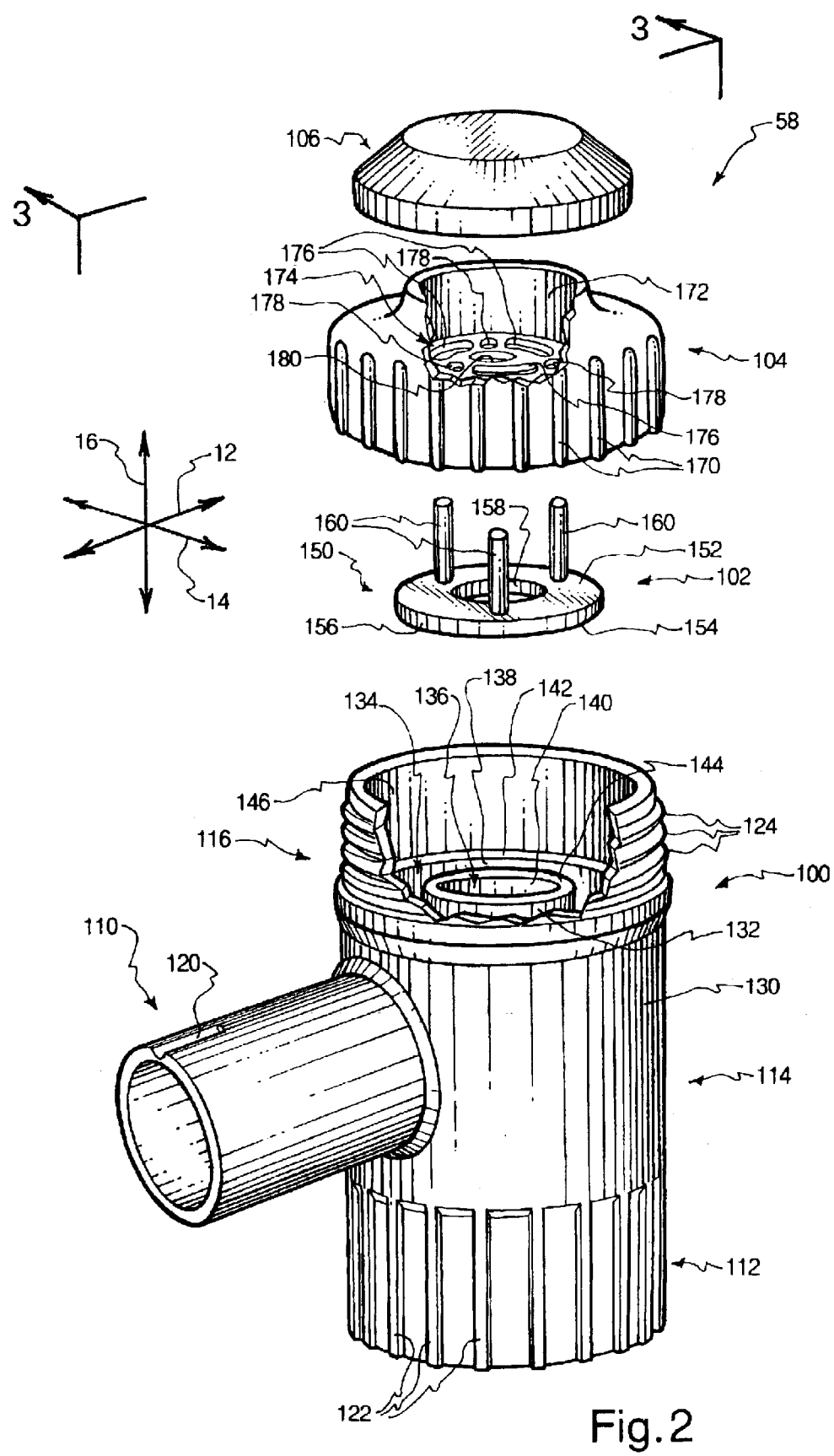
FIG. 2 is an exploded, cutaway perspective view of the first anti-siphoning device of the first anti-siphoning valve of the irrigation system of FIG. 1.

Referring to FIG. 2, an exploded, cutaway perspective view illustrates the various components of the first anti-siphoning device 58. As depicted, the first anti-siphoning device 58 has a housing 100, a plunger 102, a plunger retainer 104, and a cap 106. The housing 100 has a transfer conduit 110, a riser attachment portion 112, a main body 1 14, and a retainer attachment portion 116.

The transfer conduit 110 extends in the longitudinal direction 12 to receive irrigation water from the first valve 52. As shown, the transfer conduit 110 has a notch 120, which is designed to facilitate operation of the first valve 52 in a manner that need not be described herein. The riser attachment portion 112 has a plurality of ridges 122 designed to facilitate manual attachment of the riser attachment portion 112 to the associated riser 64. The retainer attachment portion 116 has exterior threads 124 designed to receive and engage the plunger retainer 104.

The main body 114 connects the transfer conduit 110, the riser attachment portion 12, and the retainer attachment portion 116 together and provides for fluid communication between them. More precisely, the main body 114 has an exterior wall 130 and an interior wall 132. Each of the exterior and interior walls 130, 132 has a generally annular shape as viewed along the transverse direction 16. Thus, the exterior and interior walls 130, 132 cooperate to define an inlet channel 134, and the interior wall 132 defines an outlet channel 136. The inlet channel 134 has a generally annular shape and the outlet channel 136 has a generally circular shape.

In this application, a "generally annular shape" refers to an annulus, or a shape that is open in the middle and bounded by two generally concentric, generally circular shapes. The generally annular shape can either refer to a solid object with a central opening, or to an opening with a central blockage. The generally circular shapes need not be precisely concentric or precisely circular. Indeed, some aberrations from circularity and concentricity may exist within a generally annular shape.

The inlet channel 134 has an inlet orifice 138 adjacent to the retainer attachment portion 116, as shown. The inlet orifice 138 has a generally annular shape that corresponds to the shape of the inlet channel 134. The outlet channel 136 similarly has an outlet orifice 140, which has a generally circular shape. The exterior wall 130 defines an exterior shoulder 142, and the interior wall 132 defines an interior shoulder 144. Each of the exterior and interior shoulders 142, 144 has a generally annular shape.

According to alternative embodiments, the exterior and interior walls need not be generally annular, but may comprise any closed shape with rounded segments, straight segments, or any combination thereof. Such exterior and interior walls may, for example, have an elliptical shape, a rectangular shape, a trapezoidal shape, or the like. The corresponding inlet and outlet orifices therefore also need not have generally annular or circular shapes.

Returning to the configuration of FIG. 2, the inlet and outlet orifices 138, 140 may have flow areas that are substantially equal to each other. Thus, irrigation water is able to flow from the inlet orifice 138 to the outlet orifice 140 with a comparatively small flow restriction. As a result, pressure loss through the first anti-siphoning device 58 is minimized. However, in alternative embodiments, the inlet and outlet orifices 138, 140 may have unequal flow areas, if desired.

The inlet and outlet orifices 138, 140 are disposed adjacent to a plunger cavity 146, which is disposed generally in the interior of the retainer attachment portion 116. The plunger 102 is movable within the plunger cavity 146 to provide the backflow preventative operation of the first anti-siphoning device 58. The plunger 102 may be designed to translate in the transverse direction 16, substantially without pivotal motion.

The plunger 102 has an annular portion 150 with a generally annular shape. Like the exterior and interior walls 130, 132, the plunger 102 is only an exemplary embodiment. In other embodiments, a plunger need not have a generally annular shape, but may comprise any closed shape with rounded segments, straight segments, or any combination thereof.

In FIG. 2, the annular portion 150 has an upper side 152 and a lower side 154. The upper side 152 faces into the plunger retainer 104 and the lower side 154 faces into the main body 114 of the housing 100. The annular portion 150 has an outer edge 156 with a generally circular shape and a central opening 158, which is also generally circular in shape. However, the term "central opening" refers broadly to a cavity surrounded by material within at least one plane (e.g., the plane formed by the longitudinal direction 12 and the lateral direction14). Hence, in alternative embodiments, a central opening of the plunger may have any shape. A plurality of orientation posts 160 extend toward the plunger retainer 104 from the annular portion 150.

The plunger retainer 104 has a plurality of ridges 170 designed to facilitate manual engagement of the plunger retainer 104 with the retainer attachment portion 116 of the housing 100. A lip 172 of the plunger retainer 104 extends in the transverse direction 16 toward the cap 106; the lip 172 has a generally annular shape. The plunger retainer 104 also has a retention plate 174, which may be generally disk-shaped.

The retention plate 174 has a plurality of slots 176 disposed about its periphery. Each of the slots 176 has an arcuate shape. The retention plate 174 also has a plurality of orientation holes 178, each of which is disposed to receive one of the orientation posts 160 of the plunger 102. The retention plate 174 has a hub 180 that protrudes slightly toward the plunger 102.

Figure 3:
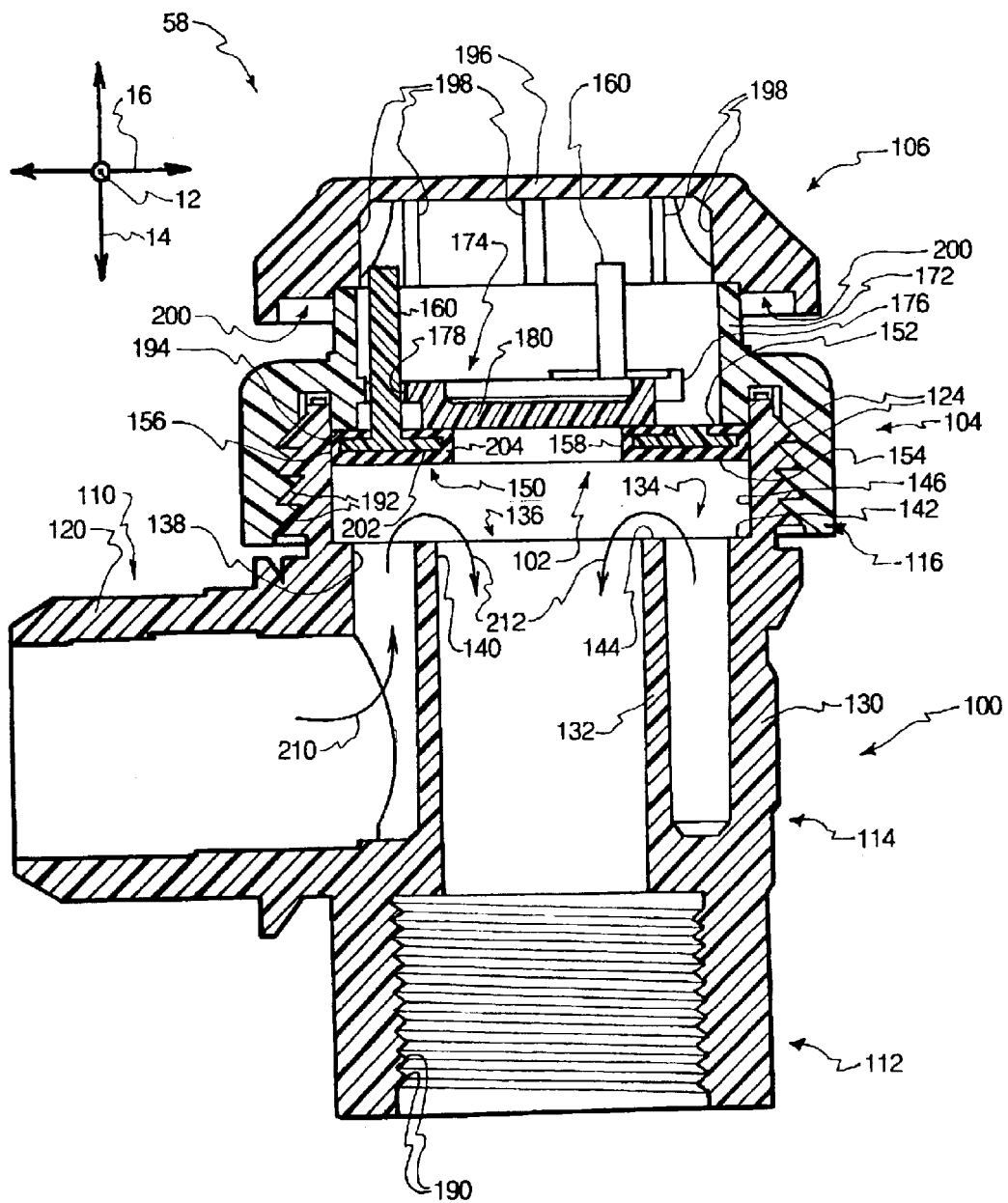
FIG. 3 is a side elevation, section view of the first anti-siphoning device of FIG. 1, with the plunger disposed in the open position to permit irrigation water flow from the inlet channel to the outlet channel.

Referring to FIG. 3, a side elevation, section view illustrates the fully assembled first anti-siphoning device 58 in the open configuration to permit irrigation water to flow from the inlet channel 134 to the outlet channel 136. As illustrated, the riser attachment portion 112 of the housing 100 has interior threads 190 designed to engage corresponding exterior threads (not shown) of the riser 64 illustrated in FIG. 1. The plunger retainer 104 similarly has interior threads 192 that engage the exterior threads 124 of the retainer attachment portion 116 of the housing.

Thus, the plunger retainer 104 and the riser 64 may simply be rotated into engagement with the housing 100. In alternative embodiments, slip fittings or the like may be used in place of the threads 124, 190, 192. As illustrated, the transfer conduit 110 is not threaded, but is designed to slide into a corresponding conduit (not shown) that extends in the longitudinal direction 12 from the first valve 52.

The plunger retainer 104 also has an exterior shoulder 194 facing the plunger cavity 146. The exterior shoulder 194 has a generally annular shape, and is coplanar with the hub 180 of the retention plate 174. The slots 176 and the orientation holes 178 are arranged in an annular region between the exterior shoulder 194 and the hub 180.

The cap 106 has a roof 196 that helps to protect the interior components of the first anti-siphoning device 58 from outside interference. The roof 196 is supported by a plurality of struts 198 distributed around the interior of the roof 196. The struts 198 are attached to the lip 172 of the plunger retainer 104. A plurality of vents 200 are defined between the struts 198. The vents 200 permit ambient air to enter the cap 106 when the plunger 102 is in the closed position, in a manner that will be described in greater detail subsequently.

As shown, the plunger 102 has a plastic core 202 disposed partially within the annular portion 150 and integrally formed with the orientation posts 160. The plastic core 202 is partially covered by an elastomeric exterior 204 to form the annular portion 150. The term "elastomeric exterior" therefore does not require that the entire plunger 102 be covered by the elastomer. The elastomeric exterior 204 is constructed of a comparatively soft elastomer designed to form a seal against the exterior shoulder 194 and the hub 180 or against the exterior and interior shoulders 142, 144.

In alternative embodiments, plungers with a variety of different configurations may be used. For example, if the exterior wall 130 and/or the interior wall 132 are not circular, the outer edge 156 and/or the central opening 158 may each have a corresponding non-circular shape, which may be similar to the shape of the exterior wall 130 and/or the interior wall 132, respectively.

In other alternative embodiments, the orientation posts 160 may interact with the retention plate 174 in a manner that permits some pivotal motion of the plunger with respect to the housing 100. For example, the the orientation holes 178 may be sized somewhat larger than the orientation posts 160 so that the orientation posts 160 are able to move to a slight angle with respect to the transverse direction 16. Hence, when backflow begins, uneven forces against the plunger 102 do not cause the plunger 102 to bind against the retention plate 174. Rather, the plunger 102 has sufficient play to return to a straight orientation and move into the closed position.

Alternatively, the orientation holes 178 may be omitted entirely, and the orientation posts 160 may simply extend through the slots 176 of the retention plate 174. The slots 176 may be sized to permit some play between the orientation posts 160 and the side walls of the slots 176. In this manner, the plunger 102 may have some play with respect to the retention plate 174 to permit the plunger 102 to return to a straight orientation after being angled by uneven pressure, as described above.

According to yet another alternative embodiment, the orientation posts 160 and the orientation holes 178 may both be omitted. A plunger according to such an embodiment is then permitted to pivot into positions nonparallel with the orifices 138, 140. Depending on the nature of the hydrodynamic forces present under backflow conditions, the plunger may reliably return to an aligned orientation without the need for guiding features.

In other alternative embodiments, the plastic core 202 may be omitted, and the plunger may be formed entirely of an elastomeric material. Such a solid elastomer plunger may be made with or without orientation posts, and may be manufactured in a comparatively simple manner.

Returning to FIG. 3, the plunger 102 is in the open position so that the upper side 152 of the annular portion 150 abuts the exterior shoulder 194 of the plunger retainer 104 and the hub 180 of the retention plate 174 of the plunger retainer 104. Thus, ambient air from the interior of the cap 106 is unable to enter the plunger cavity 146, and hence cannot reach the inlet and outlet channels 134, 136. However, the inlet and outlet orifices 138, 140 are uncovered. Thus, irrigation water moves from the transfer conduit 110 to the inlet channel 134, as indicated by the arrow 210, and is then free to flow from the inlet orifice 138 into the plunger cavity 146, and into the outlet orifice 140, as indicated by the arrows 212.

The pressure of the irrigation water within the first anti-siphoning device 58 maintains the plunger 102 in the open position. More specifically, the lower side 154 of the annular portion 150 is generally subject to the pressure of the irrigation water within the plunger cavity 146, which presses upward against the lower side 154. The upper side 152 is sealed off from the pressure of the irrigation water by the interaction of the elastomeric exterior 204 with the exterior shoulder 194 and the hub 180. Hence, only atmospheric pressure presses against the upper side 152 of the annular portion 150.

The effective area of the upper side 152 is reduced by the fact that portions of the upper side 152 are covered by the hub 180 and the exterior shoulder 194. The upward velocity of irrigation water exiting the inlet channel 134 also serves to press the annular portion 150 upward to keep the plunger 102 in the open position.

Thus, irrigation water is able to pass from the first valve 52 to the first distribution conduit 36 during normal irrigation system operation. Air is generally not permitted to enter the irrigation system 10. However, when certain changes occur within the irrigation system 10, such as when the valves 52, 54, 56 are initially turned on or off by the timer 90, back pressure may exist, and may tend to draw the irrigation water from the outlet channel 136 back into the inlet channel 134. For the reasons described above, this is undesirable.

Under backflow conditions, the pressure of the irrigation water within the first anti-siphoning device 58 will decrease, and irrigation water will begin to flow upward from the outlet channel 136 rather than from the inlet channel 134. The velocity of the irrigation water is thus directed toward the central opening 158, rather than to the body of the annular portion 150. Consequently, the pressure and velocity of the irrigation water no longer press upward against the annular portion 150 with a force sufficient to keep the plunger 102 in the open position. The plunger 102 falls to reach the closed position, which is illustrated in FIG. 4.

Figure 4:
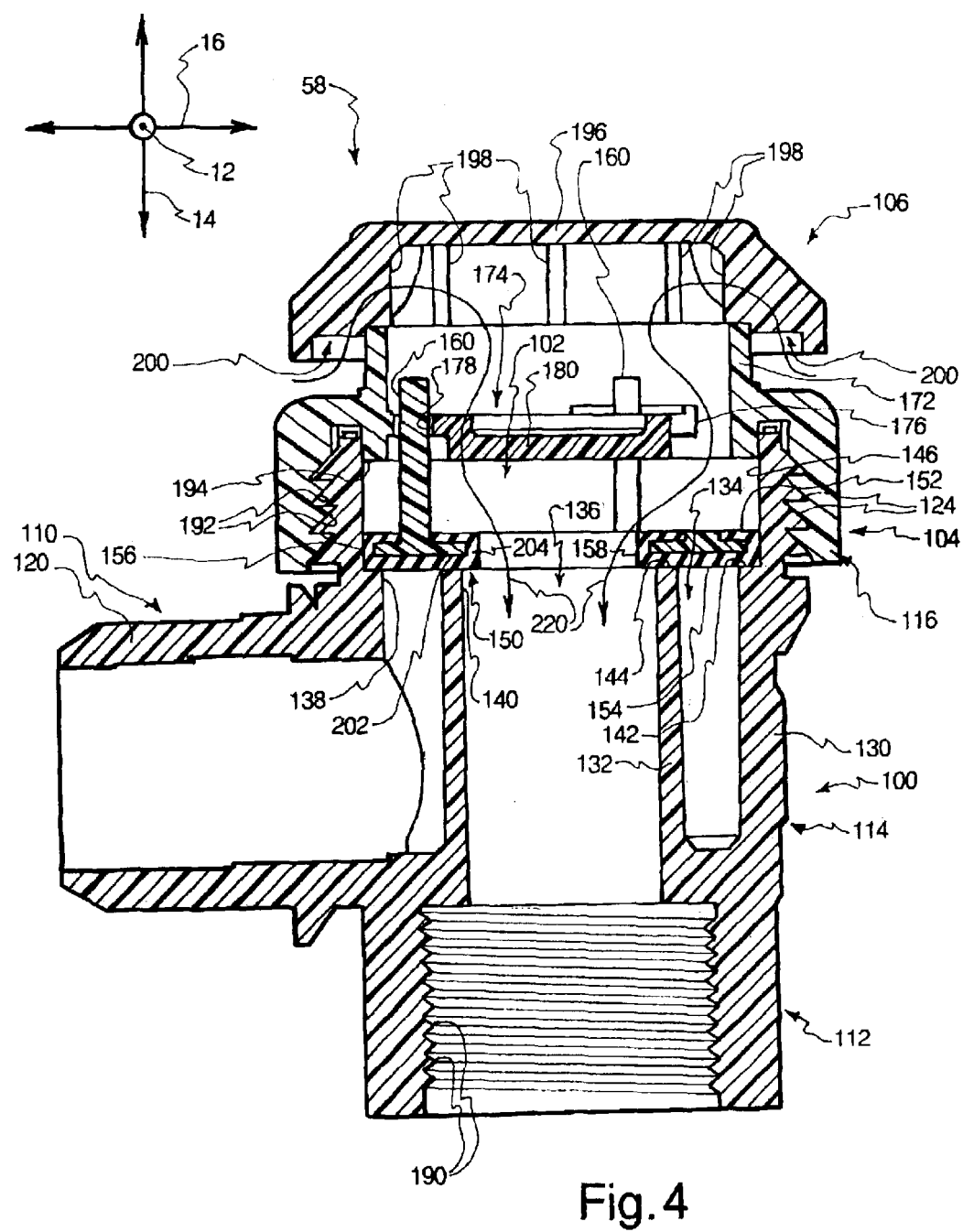
FIG. 4 is a side elevation, section view of the first anti-siphoning device of FIG. 1, with the plunger disposed in the closed position to block irrigation water flow from the outlet channel to the inlet channel while permitting ambient air to enter the outlet channel.

Referring to FIG. 4, a side elevation, section view illustrates the first anti-siphoning device 58 with the plunger 102 in the closed position to block backflow. The plunger 102 is kept in an orientation in which the annular portion 150 is generally parallel to the inlet and outlet orifices 138, 140 by the interaction of the orientation posts 160 with the orientation holes 178 of the retention plate 174. The plunger 102 reacts rapidly to retrograde pressure, thereby ensuring that little backflow occurs before the plunger 102 reaches the closed position. According to selected embodiments, the first anti-siphoning device 58 may permit backflow of a volume of irrigation water equal to or less than that of a three-quarter inch diameter column ranging in height from about one-eighth to one half inch. Furthermore, the column may be about one quarter inch high.

When the plunger 102 reaches the closed position, the lower side 154 of the annular portion 150 abuts the exterior shoulder 142 of the exterior wall 130 and the interior shoulder 144 of the interior wall 132. The elastomeric exterior 204 serves to provide a generally watertight seal between the exterior and interior shoulders 142, 144 and the annular portion 150 to block water flow from the plunger cavity 146 into the inlet orifice 138.

Since the upper side 152 of the annular portion 150 no longer abuts the retention plate 174, the slots 176 are now exposed to permit ambient air to flow from the interior of the cap 106 to the plunger cavity 146. The air enters the cap 106 through the vents 200, then moves through the slots 176 and through the central opening 158 of the annular portion 150 of the plunger 102 to reach the outlet orifice 140, as shown by the arrows 220. The air enters the outlet channel 136 to dispel the vacuum, thereby eliminating the tendency for irrigation water to flow retrograde through the first anti-siphoning device 58.

The plunger 102 is held in place as long as the vacuum effect is present. More specifically, under backflow-inducing conditions, the pressure within the inlet channel 134 will generally be smaller than that of the ambient air. The smaller pressure within the inlet channel 134 presses upward against the lower side 154 of the annular portion 150. However, portions of the lower side 154 are occluded by the exterior and interior shoulders 142, 144, and thus may not be subject to the pressure within the inlet channel 134. Since the slots 176 are unblocked, the upper side 152 is exposed to the comparatively larger pressure of the ambient air, which tends to press the annular portion 150 downward against the exterior and interior shoulders 142, 144.

Thus, the plunger 102 is held in the closed position until the vacuum effect is dissipated by the ambient air entering the first anti-siphoning device 58 through the vents 200. Backflow-inducing conditions may exist directly after the first valve 52 has been moved to a closed configuration. After the plunger 102 moves to the closed position illustrated in FIG. 4, the plunger 102 may be pressed back to the open position in response to a return of the first valve 52 to the open configuration, and a corresponding increase in irrigation water pressure and flow rate within the inlet channel 134.

The first anti-siphoning device 58 may be manufactured according to a wide variety of methods. According to one example, the housing 100, the plunger 102, the plunger retainer 104, and the cap 106 are each injection molded. The cap 106 may be formed in a standard injection molding processes, with two mold plates that have cavities shaped to cooperate to define the shape of the cap 106. For the plunger retainer 104, the injection molding machine may utilize some type of retractable core member in addition to the two plates. To form the slots 176, the orientation holes 178, and/or other interior features.

The housing 100 may also be manufactured by injection molding. Again, two cooperating mold plates may be used. Also, multiple core members may be disposed within the cavity defined by the plates to form the inlet channel 134, the outlet channel 136, the interior threads 190, and the interior of the transfer conduit 110. According to certain methods, the housing 100 may be integrally formed through the use of a single injection molding process. Thus, additional welding operations or other attachment procedures need not be carried out to form the housing 100.

The plunger 102 may be made through the use of a two-step procedure. The plastic core 202 may first be formed through the use of injection molding. Then, the plastic core 202 may be disposed partially within another mold, so that only the orientation posts 160 protrude from the mold. An elastomer may be injected into the second mold and allowed to cool to form the elastomeric exterior 204 of the plunger 102.

The housing 100, the plunger 102, the plunger retainer 104, and the cap 106 may then be assembled. The cap 106 may be attached to the lip 172 of the plunger retainer 104, for example, by welding the struts 198 to the lip 172. The plunger 102 may then be disposed such that the orientation posts 160 extend through the orientation holes 178 of the retention plate 174 of the plunger retainer 104. The plunger retainer 104 and the housing 100 may then be attached together by engaging the interior threads 192 of the plunger retainer 104 with the exterior threads 124 of the retainer attachment portion 116 of the housing 100. The first anti-siphoning device 58 is then complete and ready to be attached to the first valve 52 to form the first anti-siphoning valve 46.

In alternative embodiments, the various components of an anti-siphoning device according to the invention need not be formed of only of polymeric or elastomeric materials. Rather, an anti-siphoning device may be made of polymers, elastomers, metals, ceramics, composites, and combinations thereof. A wide variety of manufacturing processes may thus be utilized to form the various components of the anti-siphoning device.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. An anti-siphoning device for use with an irrigation system, the anti-siphoning device comprising:
    an interior wall defining an outlet orifice;
    an exterior wall extending around the interior wall, wherein the exterior wall cooperates with the interior wall to define an inlet orifice;
    a plunger movable between an open position and a closed position, wherein the plunger covers the inlet orifice to block irrigation water flow into the inlet orifice in the closed position, and to permit irrigation water flow out of the inlet orifice in the open position;
    a plunger retainer attached to the housing, the plunger retainer having at least one feature shaped to contact the plunger to maintain alignment of the plunger with the inlet and outlet orifices; and
    a cap attached to the plunger retainer, the cap having a vent shaped to permit air to enter the anti-siphoning device in response to low pressure within the anti-siphoning device.

2. The anti-siphoning device of claim 1, wherein each of the interior and exterior walls comprises a generally annular cross section.

3. The anti-siphoning device of claim 2, wherein the plunger comprises a generally annular shape with an interior opening positioned to be aligned with the outlet orifice.

4. The anti-siphoning device of claim 1, wherein the plunger comprises an elastomeric exterior and at least one orientation post extending generally away from the inlet and outlet orifices to restrict an orientation of the plunger.

5. The anti-siphoning device of claim 1, wherein the interior and exterior walls are incorporated into an integrally formed housing shaped to at least partially enclose the plunger.

6. An anti-siphoning valve for an irrigation system, the anti-siphoning valve comprising:
    a valving device connected to receive irrigation water from a water supply; and
    an anti-siphoning device comprising an outlet channel disposed within an inlet channel disposed to receive the irrigation water from the valving device, wherein at least a portion of the inlet channel has a generally annular shape coaxial with a generally circular shape of at least a portion of the outlet channel, wherein the anti-siphoning device permits irrigation water flow from the inlet channel to the outlet channel and blocks irrigation water flow from the outlet channel to the inlet channel;
    wherein a cap is attached to the anti-siphoning device, the cap having a vent shaped to permit air to enter the anti-siphoning device in response to low pressure within the anti-siphoning device.

7. The anti-siphoning valve of claim 6, further comprising a plunger that is movable to block the inlet channel, thereby blocking irrigation water flow from the outlet channel to the inlet channel.

8. The anti-siphoning valve of claim 7, wherein the plunger comprises a generally annular shape with an interior opening, the plunger comprising an elastomeric exterior disposed to contact the inlet channel to provide a water resistant seal between the plunger and the inlet channel.

9. The anti-siphoning valve of claim 6, wherein the inlet and outlet channels are incorporated into an integrally formed housing shaped to at least partially enclose the plunger.

10. An anti-siphoning device for use with an irrigation system, the anti-siphoning device comprising:
   a housing having an inlet orifice and an outlet orifice formed therein;
   a plunger disposed to move in response to pressures within the anti-siphoning device between an open position to permit irrigation water to flow from the inlet orifice to the outlet orifice and a closed position to block irrigation water flow from the outlet orifice to the inlet orifice; wherein the plunger has a central opening, wherein the plunger comprises at least one orientation post extending generally perpendicular to the outlet orifice to restrict an orientation of the plunger; and
   a cap having a vent shaped to permit air to enter the anti-siphoning device in response to pressures within the anti-siphoning device.

11. The anti-siphoning device of claim 10, wherein the inlet orifice has a generally annular shape and wherein the plunger also has a generally annular shape.

12. The anti-siphoning device of claim 10, wherein the plunger comprises an annular portion that moves between the open and closed positions substantially independently of any orientation features attached to the annular portion.

13. The anti-siphoning device of claim 10, wherein the plunger comprises an elastomeric exterior disposed to contact the inlet orifice to provide a water resistant seal between the plunger and the inlet orifice.

14. The anti-siphoning device of claim 13, wherein the plunger comprises a plastic core to which the elastomeric exterior adheres.

15. The anti-siphoning device of claim 10, wherein the inlet and outlet orifices are formed in an integrally formed housing shaped to at least partially enclose the plunger.

16. The anti-siphoning device of claim 10, further comprising a plunger retainer attached to the housing, the plunger retainer having at least one feature shaped to contact the plunger to maintain alignment of the plunger with the inlet and outlet orifices.

17. An irrigation system configured to irrigate an area, the irrigation system comprising:
   at least one water distribution unit that distributes irrigation water over at least a portion of the area;
   at least one distribution conduit, each distribution conduit conveying irrigation water to at least one water distribution unit;
   at least one anti-siphoning valve having an open configuration that permits irrigation water flow to one of the distribution conduits and a closed configuration that restricts irrigation water flow to the distribution conduit, the anti-siphoning valve having an anti-siphoning device comprising a plunger that is movable to permit irrigation water to flow from the anti-siphoning valve to the distribution conduit and to restrict irrigation water flow from the distribution conduit to the anti-siphoning valve, the plunger having a central opening, wherein the plunger comprises at least one orientation post extending generally perpendicular to the interior opening to restrict an orientation of the plunger; and
   a control unit that transmits valve activation signals to initiate motion of the anti-siphoning valve between the open configuration and the closed configuration.

18. The irrigation system of claim 17, wherein the anti-siphoning valve comprises an anti-siphoning device having an inlet orifice and an outlet orifice, the inlet orifice having a generally annular shape, wherein the plunger also has a generally annular shape such that the plunger is abuttable against the inlet orifice to block irrigation water flow into the inlet orifice.

19. The irrigation system of claim 17, wherein the plunger comprises an elastomeric exterior disposed to provide a water resistant seal that restricts irrigation water flow from the distribution conduit to the anti-siphoning valve.

20. The irrigation system of claim 19, wherein the plunger comprises a plastic core to which the elastomeric exterior adheres.

21. A method for manufacturing an anti-siphoning device, the method comprising:
   forming an interior wall to define an outlet orifice;
   forming an exterior wall extending around the interior wall to define an inlet orifice;
   forming a plunger shaped to cover the inlet orifice, wherein the plunger comprises at least one orientation post extending generally perpendicular to the inlet orifice to restrict an orientation of the plunger;
   forming a cap having a vent; and
   assembling the interior wall, the exterior wall, the plunger, and the cap in such a manner that the plunger is movable in response to pressure in the anti-siphoning device between a closed position that blocks irrigation water flowing into the inlet orifice from the outlet orifice and an open position that blocks airflow through the vent into the anti-siphoning device and allows irrigation water to flow from the inlet orifice into the outlet orifice.

22. The method of claim 21, wherein forming the interior wall comprises forming a first annulus, and wherein forming the exterior wall comprises forming a second annulus coaxial with the first annulus.

23. The method of claim 21, wherein forming the interior and exterior walls comprises integrally forming a housing that incorporates the interior and exterior walls.

24. The method of claim 21, further comprising forming a plunger retainer, and assembling the plunger retainer with the interior wall, the exterior wall, the plunger, and the cap to restrict an orientation of the plunger.

25. The method of claim 21, wherein forming the plunger comprises forming a central opening positioned to align with the outlet orifice upon assembly of the plunger with the interior wall.

26. The method of claim 21, wherein forming the plunger comprises providing a plastic core, and molding an elastomeric material around the plastic core to form an elastomeric exterior.

27. A method for preventing backflow through an anti-siphoning device, the anti-siphoning device comprising an inlet orifice, and outlet orifice, and a plunger having a central opening, the method comprising:
   moving the plunger to abut the inlet orifice in response to pressure in the anti-siphoning device;
   substantially blocking irrigation water flow through the inlet orifice with the plunger; and
   providing communication between ambient air and the outflow conduit through the central opening, wherein the outlet orifice is defined by an interior wall having a substantially annular shape and the inlet orifice is defined by the interior wall in combination with an exterior wall extending around the interior wall and having a substantially annular shape, the plunger having a substantially annular shape, wherein moving the plunger to abut the inlet orifice comprises translating the plunger to contact edges of the interior and exterior walls.

28. The method of claim 27, wherein the anti-siphoning device further comprises a cap comprising a vent and a plunger retainer comprising a plurality of slots, wherein providing communication between ambient air and the outflow conduit comprises withdrawing the plunger from the plunger retainer to permit airflow through the vent, through the slots, through the central opening, and into the outflow conduit.

* * * * *